Feb. 15, 1966  H. L. GUBBINS, JR  3,234,799
SAFETY CIRCUIT FOR ACCELERATION COMPENSATION PENDULUM CONTROLS
Filed May 16, 1962
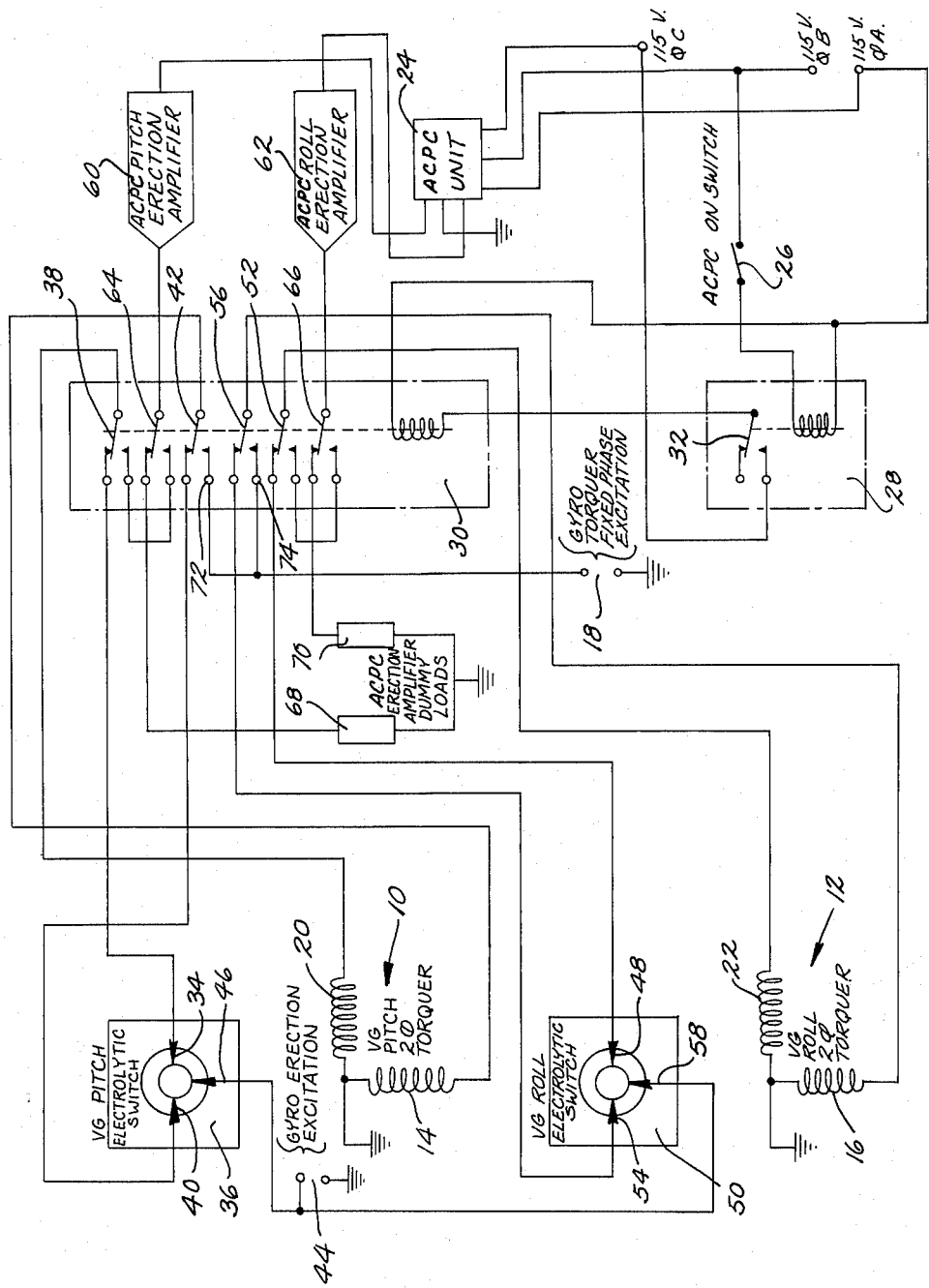
INVENTOR.
HARRY L. GUBBINS JR.
BY
ATTORNEYS

United States Patent Office 3,234,799
Patented Feb. 15, 1966

3,234,799
SAFETY CIRCUIT FOR ACCELERATION COMPENSATION PENDULUM CONTROLS
Harry L. Gubbins, Jr., Grand Rapids, Mich., assignor to Lear Siegler, Inc.
Filed May 16, 1962, Ser. No. 195,194
5 Claims. (Cl. 74—5.47)

This invention concerns acceleration compensation pendulum control systems for maintaining the erection of vertical reference gyroscopic devices, and more particularly a safety circuit which utilizes the rough erection system of the gyroscopic device for preventing total disablement of the gyroscopic device in the event of failure of the pendulum power supply.

A crucial element in automatic navigational systems for aeronautical and astronautical purposes is the vertical gyro erection system which controls the attitude of an aircraft by reference to the vertical gyro device. In the automatic control of high speed vehicles of this type, the reference signal for the vertical erection of the gyro in flight is normally provided by an acceleration compensation pendulum control unit which is at all times aligned with the vertical, regardless of any acceleration or centrifugal force to which the craft may be subjected. This acceleration compensation pendulum control is extremely accurate, and it is therefore the component which keeps track of the proper functioning of the vertical gyro in flight. For the initial erection, however, it is necessary to rely on an electrolytic switch system consisting of a pair of electrolytic switches mounted at right angles to one another. In practice, the vertical gyro is normally switched onto the electrolytic system when it is first erected, and is then switched over to the acceleration compensation pendulum control.

By their nature, the electrolytic system and the acceleration compensation pendulum control system require different types of power supplies, and chances are, therefore, that in the event of failure of one of these power supplies, the other will remain operative. The present invention takes advantage of that fact, and of the fact that the electrolytic system is always present though normally inoperative in flight, to provide a safety system by which a failure of the acceleration compensation pendulum control power supply will not result in a total failure of the navigational system, but only in its temporary control by the electrolytic system which is affected by acceleration and centrifugal forces, but is nevertheless reasonably able to keep the navigational system in an at least partially operative condition until the cause of the power failure can be corrected or the craft can be brought in for an emergency landing. At the same time, the circuit of this invention causes the switchover to occur automatically immediately upon occurrence of the trouble and therefore prevents the gyroscopic system from getting seriously out of adjustment before a manual switchover can be effected by the human pilot.

It is therefore the primary object of the invention to provide a safety system for gyroscopic erection mechanisms operated by an acceleration compensation pendulum control which causes control of the erection system to be transferred to the electrolytic erection system immediately upon failure of the power supply for the acceleration compensation pendulum control, and which automatically returns control to the acceleration compensation pendulum when its operating power is re-established.

It is a further object of this invention to protect the erection amplifiers against burn-out in case of failure of the pendulum control power supply without concurrent failure of the amplifier power supply, by connecting dummy loads to the amplifier outputs while the pendulum control system is disconnected from the torque motors of the erection system.

These and other purposes of the invention will become readily apparent from a perusal of the following specification, taken in connection with the accompanying drawings in which the single figure is a schematic wiring diagram showing the safety system of this invention.

Basically, the inventive system consists of a relay arrangement so connected that a failure of any one of the three phases of the acceleration compensation pendulum control power supply will cause control of the erection system to be transferred from the acceleration compensation pendulum system to the electrolytic switch system. For rough alignment purposes upon starting the vertical gyro, one of the phases of the acceleration compensation pendulum control power supply can be manually disabled by a switch so as to assure starting control by the electrolytic switch system. According to one of the features of the invention, the acceleration compensation pendulum control signal amplifiers are protected against burn-out while disconnected from the erection system by automatically connecting dummy loads across their outputs whenever their connection to the torque motors of the erection system is broken.

Referring now to the drawing, the vertical gyro erection system is schematically represented by its pitch torquer 10 and its roll torquer 12. In flight, the reference winding 14 of torquer 10 and the reference winding 16 of torquer 12 are normally powered by a fixed phase excitation 18 derived from, and in fixed phase relationship to, the three-phase power supply of the acceleration compensation pendulum control unit. The actuating winding 20 of the pitch torquer 10 is fed the pitch erection signal from the acceleration compensation pendulum control unit 24, and the actuating winding 22 of the roll torquer 12 is fed the roll erection signal from the acceleration compensation pendulum control unit 24. During the starting operation of the vertical gyro, however, the "acceleration compensation pendulum control on" switch 26 is manually opened so as to maintain relay 28 in the de-energized position. This breaks the circuit of the coil of relay 30 at the contact 32 and thus maintains relay 30 in the de-energized condition also. In this condition, the actuating winding 20 of the pitch torquer 10 becomes connected to the sensing electrode 34 of the pitch electrolytic switch 36 through contact 38 of relay 30. The electrolytic switch 36 may be, for example, of the type shown in U.S. Patent 2,830,159 and may use an electrolyte such as that described in U.S. Patent 2,899,393. The other sensing electrode 40 of the pitch electrolytic switch 36 is connected to the reference winding 14 of pitch torquer 10 through contact 42 of relay 30. The alternating current gyro erection excitation 44 is applied to the center electrode 46 of the pitch electrolytic switch 36 and is distributed by the switch in varying proportions to the sensing electrodes 34 and 40 depending on the physical attitude of the switch 36. The relative excitation of winding 14 and 20 of the pitch torquer 10 carries out the erection function indicated by the attitude sensed by the pitch electrolytic switch 36.

In a like manner, sensing electrode 48 of the roll electrolytic switch 50 is connected through contact 52 of relay 30 to the actuating winding 22 of the roll torquer 12, and the sensing electrode 54 of roll electrolytic switch 50 is connected through contact 56 of relay 30 to the reference winding 16 of roll torquer 12. The center electrode 58 of roll electrolytic switch 50 is connected to the gyro erection excitation source 44 in the same manner as center electrode 46 of the pitch electrolytic switch 36.

The erection amplifiers 60, 62 of the acceleration compensation pendulum control unit 24 will normally be under power whenever the electrolytic switch system is operative. In order to prevent damage to the amplifiers 60, 62 by removal of the load therefrom, contacts 64, 66 of relay 30 are arranged to connect the amplifiers 60, 62 to the dummy loads 68, 70, respectively, whenever the relay 30 is in its de-energized condition. If all systems are functioning properly the acceleration compensation pendulum control unit 24 will also be operative during the starting operation, but its signals are fed into the dummy loads 68, 70 and do not affect the operation of the erection system.

When the vertical gyro has been erected to within the erection cutoff limits of the acceleration compensation pendulum control, switch 26 is closed either manually or by any desired mechanical means such as a timer, and relay 28 now closes. This closes contacts 32 of relay 28, and this in turn energizes relay 30. As will be readily seen from the diagram, this has the effect of switching the reference windings 14, 16 of the torquers 10, 12 onto the fixed phase excitation 18 through contacts 42 and 56, respectively, of relay 30. At the same time, the actuating winding 20 of the pitch torquer 10 is connected to the pitch erection amplifier 60 through contacts 38 and 64 of relay 30, and the actuating winding 22 of the roll torquer 12 is connected to the roll erection amplifier 62 through contacts 52 and 66 of relay 30. The sensing electrodes of both electrolytic switches are disconnected from the erection system at contacts 38, 42, 56 and 52 when relay 30 is energized.

*Operation of the safety circuit*

If, for any reason, a failure in the three-phase power supply for the acceleration compensation pendulum control unit occurs in flight, the circuit returns control of the erection system to the electrolytic switch system in the following manner: If a failure occurs in phase C, relay 28 will continue to be energized but relay 30 no longer has any power applied to it. If a failure occurs in phase B, relay 28 will become de-energized, and although power for relay 30 is still present, the opening of contacts 32 due to the de-energization of relay 28 will cause relay 30 to become de-energized also. If a failure occurs in phase A, the power supply to both relays is broken, and both will become de-energized.

The invention has been described herein with reference to an acceleration compensation pendulum control unit having separate pitch and roll signal outputs. It will be understood that the safety circuit described herein is equally usable with an acceleration compensation pendulum control unit such as that described in the co-pending application Serial No. 183,846 filed March 30, 1962, and entitled Polar Coordinate Position Sensing, now abandoned, which has only a single signal output. If such a single-output acceleration compensation pendulum control unit is used, the terminals 72, 74 of relay 30 would not be connected together, but would instead be connected to two separate fixed phase excitations ninety degrees out of phase with one another. On the other hand, contacts 64 and 66 would in that event be connected together and to the single control signal amplifier described in the aforesaid co-pending application.

It will be seen that the present invention can be carried out in a variety of ways of which the example described herein is merely illustrative. Consequently, I do not desire to be limited by the embodiment shown, but only by the scope of the following claims.

I claim:

1. A control circuit for a gyroscopic device, comprising: acceleration compensation pendulum means; electrolytic attitude sensing means; erection means for erecting said gyroscopic device; first control means associated with said pendulum means for controlling said erection means; a power supply for said first control means; second control means associated with said electrolytic attitude sensing means for controlling said erection means; and means operable to selectively interconnect one of said control means and said erection means; said interconnecting means being responsive to a power failure of said power supply for said first control means to interconnect said second control means and said erection means and to disconnect said first control means therefrom upon the occurrence of said power failure.

2. A control circuit for a gyroscopic device, comprising: acceleration compensation pendulum means having attitude signal output means; a three-phase power supply for powering said pendulum means; a pair of torque motors for erecting said gyroscopic device; a source of fixed phase excitation for said torque motors derived from said three-phase power supply; a pair of electrolytic attitude sensing means; a source of erection excitation connected to said electrolytic sensing means and independent of said three-phase power supply; relay means connected to said three-phase power supply, said relay means when energized connecting said torque motors to said fixed phase excitation and to said attitude signal output means, and said relay means when de-energized connecting said torque motors each to one of said electrolytic attitude sensing means; and means for manually de-energizing said relay means.

3. The circuit of claim 2, in which a dummy load means is provided and in which said acceleration compensation pendulum means comprises an acceleration compensation pendulum control unit and output signal amplifier means; and said relay means when de-energized being arranged to connect said dummy load means to said amplifier means.

4. The circuit of claim 2, in which said relay means comprise a pair of relays connected across different pairs of phases of said three-phase power supply, one of said relays having a pair of contacts inserted into the coil circuit of said other relay, whereby interruption of any phase of said three-phase supply will cause said other relay to become de-energized.

5. A control circuit for a gyroscopic device, comprising: acceleration compensation pendulum means having a pitch signal output and a roll signal output; a three-phase power supply for powering said pendulum means; a pair of torque motors for erecting said gyroscopic device; a source of fixed phase excitation for said torque motors; a pair of electrolytic attitude sensing means; a source of erection excitation connected to said electrolytic sensing means; relay means connected to said three-phase power supply, said relay means when energized connecting both of said torque motors to said fixed phase excitation and one of said motors to said pitch signal output and the other of said motors to said roll signal output; and said relay means when de-energized connecting said torque motors each to one of said electrolytic attitude sensing means; and means for manually de-energizing said relay means.

References Cited by the Examiner

UNITED STATES PATENTS

| | | | |
|---|---|---|---|
| 2,817,975 | 12/1957 | Granquist | 74—5.47 |
| 2,973,651 | 3/1961 | Swarts et al. | 74—5.41 |
| 2,995,039 | 8/1961 | Weiser | 74—5.41 |

BROUGHTON G. DURHAM, *Primary Examiner.*

T. E. SHEAR, *Assistant Examiner.*